US009265070B2

(12) United States Patent
Yi et al.

(10) Patent No.: US 9,265,070 B2
(45) Date of Patent: *Feb. 16, 2016

(54) METHOD FOR DETECTING FAILURES OF RANDOM ACCESS PROCEDURES

(71) Applicant: LG ELECTRONICS INC., Seoul (KR)

(72) Inventors: Seung-June Yi, Anyang-si (KR);
Sung-Jun Park, Anyang-si (KR);
Young-Dae Lee, Anyang-si (KR);
Sung-Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/641,000

(22) Filed: Mar. 6, 2015

(65) Prior Publication Data
US 2015/0181623 A1    Jun. 25, 2015

Related U.S. Application Data

(63) Continuation of application No. 13/896,189, filed on May 16, 2013, which is a continuation of application No. 13/101,565, filed on May 5, 2011, now Pat. No. 8,477,634, which is a continuation of application No.
(Continued)

(30) Foreign Application Priority Data

Jun. 16, 2009 (KR) .......................... 10-2009-0053407

(51) Int. Cl.
H04W 74/08 (2009.01)
H04W 72/04 (2009.01)
H04W 24/02 (2009.01)

(52) U.S. Cl.
CPC .......... *H04W 74/0833* (2013.01); *H04W 24/02* (2013.01); *H04W 72/042* (2013.01); *H04W 74/0841* (2013.01); *H04W 74/0858* (2013.01)

(58) Field of Classification Search
CPC .......... H04W 74/0833; H04W 72/042; H04W 74/0841; H04W 24/02; H04W 74/0858
See application file for complete search history.

(56) References Cited

U.S. PATENT DOCUMENTS

| 6,594,240 B1 | 7/2003 | Chuah et al. ............... 370/328 |
| 6,785,548 B2 | 8/2004 | Moulsley et al. ........... 455/450 |

(Continued)

FOREIGN PATENT DOCUMENTS

| CN | 1315099 A | 9/2001 |
| CN | 101188852 A | 5/2008 |

(Continued)

OTHER PUBLICATIONS

LG Electronics Inc., Correction to RACH Procedure, 3GPP TSG-RAN2 Meeting #64 R2-087070, Nov. 10-14, 2008.
(Continued)

*Primary Examiner* — Brian D Nguyen
(74) *Attorney, Agent, or Firm* — Dentons US LLP

(57) ABSTRACT

A method of performing a random access channel (RACH) procedure between a mobile terminal and a network includes the steps of detecting whether a random access response (RAR) is received from the network within a certain time period, the RAR including information about a random access channel (RACH) preamble transmitted to the network; and if the RAR is not received within the certain time period or if the information about the transmitted RACH preamble included in the RAR does not match the transmitted RACH preamble, performing a first procedure to detect failures in the RACH procedure; and if the RAR is received within the certain time period and if the information about the transmitted RACH preamble included in the RAR matches the transmitted RACH preamble, performing a second procedure to detect failures in the RACH procedure.

12 Claims, 8 Drawing Sheets

Related U.S. Application Data

12/457,654, filed on Jun. 17, 2009, now Pat. No. 7,957,298.

(60) Provisional application No. 61/074,998, filed on Jun. 23, 2008, provisional application No. 61/073,743, filed on Jun. 18, 2008.

(56) References Cited

U.S. PATENT DOCUMENTS

| | | | |
|---|---|---|---|
| 6,836,469 B1 | 12/2004 | Wu | 370/322 |
| 7,075,971 B2 | 7/2006 | Parsa et al. | 375/141 |
| 7,848,346 B2 | 12/2010 | Park et al. | |
| 7,957,298 B2 | 6/2011 | Yi et al. | |
| 7,979,769 B2 | 7/2011 | Chun et al. | |
| 7,986,946 B2 | 7/2011 | Pettersson | 455/424 |
| 8,027,356 B2 | 9/2011 | Lee et al. | |
| 8,274,969 B2 | 9/2012 | Wu | |
| 8,493,994 B2 | 7/2013 | Park et al. | |
| 8,681,608 B2 * | 3/2014 | Lee et al. | 370/229 |
| 8,908,570 B2 | 12/2014 | Yu et al. | |
| 9,049,728 B2 | 6/2015 | Park et al. | |
| 2001/0043582 A1 | 11/2001 | Nakada | |
| 2002/0009067 A1 | 1/2002 | Sachs et al. | |
| 2002/0154653 A1 | 10/2002 | Benveniste | 370/447 |
| 2002/0167920 A1 | 11/2002 | Miyazaki et al. | 370/329 |
| 2003/0095534 A1 | 5/2003 | Jiang | |
| 2004/0147276 A1 | 7/2004 | Gholmieh et al. | |
| 2004/0185892 A1 | 9/2004 | Iacono et al. | |
| 2005/0014508 A1 | 1/2005 | Moulsley et al. | 455/450 |
| 2005/0078641 A1 | 4/2005 | Kim | |
| 2005/0117675 A1 | 6/2005 | Das et al. | 375/343 |
| 2005/0141436 A1 | 6/2005 | Dick et al. | |
| 2005/0249123 A1 | 11/2005 | Finn | |
| 2006/0013182 A1 | 1/2006 | Balasubramanian et al. | |
| 2006/0013268 A1 | 1/2006 | Terry | |
| 2006/0280145 A1 | 12/2006 | Revel et al. | |
| 2007/0206531 A1 | 9/2007 | Pajukoski et al. | |
| 2008/0008212 A1 | 1/2008 | Wang et al. | |
| 2008/0096563 A1 | 4/2008 | Fischer et al. | |
| 2008/0098234 A1 | 4/2008 | Driscoll et al. | |
| 2008/0186892 A1 | 8/2008 | Damnjanovic | |
| 2008/0188247 A1 | 8/2008 | Worrall | |
| 2008/0192766 A1 | 8/2008 | Ranta-Aho et al. | |
| 2008/0194259 A1 * | 8/2008 | Vujcic et al. | 455/435.1 |
| 2008/0207150 A1 | 8/2008 | Malladi | |
| 2008/0232317 A1 | 9/2008 | Jen | |
| 2008/0232329 A1 * | 9/2008 | Jen | 370/335 |
| 2008/0233941 A1 * | 9/2008 | Jen | 455/418 |
| 2008/0310396 A1 | 12/2008 | Park | |
| 2008/0313300 A1 | 12/2008 | Alanara et al. | |
| 2008/0316961 A1 | 12/2008 | Bertrand et al. | |
| 2009/0041240 A1 * | 2/2009 | Parkvall et al. | 380/247 |
| 2009/0041246 A1 * | 2/2009 | Kitazoe | 380/270 |
| 2009/0046641 A1 | 2/2009 | Wang et al. | |
| 2009/0086671 A1 | 4/2009 | Pelletier et al. | |
| 2009/0088195 A1 | 4/2009 | Rosa et al. | |
| 2009/0156194 A1 | 6/2009 | Meylan | |
| 2009/0175187 A1 | 7/2009 | Jersenius et al. | |
| 2009/0186624 A1 | 7/2009 | Cave et al. | |
| 2009/0196208 A1 | 8/2009 | Yu et al. | |
| 2009/0201873 A1 | 8/2009 | Korhonen et al. | |
| 2009/0209248 A1 | 8/2009 | Lee et al. | |
| 2009/0213968 A1 | 8/2009 | Tormalehto | |
| 2009/0225711 A1 | 9/2009 | Sammour et al. | |
| 2009/0232076 A1 | 9/2009 | Kuo | |
| 2009/0259910 A1 | 10/2009 | Lee et al. | |
| 2009/0279495 A1 | 11/2009 | Yoo | |
| 2009/0300457 A1 | 12/2009 | Kuo | |
| 2009/0303954 A1 | 12/2009 | Guo | |
| 2009/0305665 A1 | 12/2009 | Kennedy et al. | |
| 2009/0316593 A1 | 12/2009 | Wang et al. | |
| 2010/0027511 A1 | 2/2010 | Terry | |
| 2010/0034162 A1 | 2/2010 | Ou et al. | |
| 2010/0080181 A1 | 4/2010 | Yamada et al. | |
| 2010/0093386 A1 | 4/2010 | Damnjanovic et al. | |
| 2010/0111067 A1 | 5/2010 | Wu | |
| 2010/0202288 A1 | 8/2010 | Park et al. | |
| 2010/0226325 A1 | 9/2010 | Chun et al. | |
| 2010/0260136 A1 | 10/2010 | Fan et al. | |
| 2010/0281486 A1 | 11/2010 | Lu et al. | |
| 2011/0002262 A1 | 1/2011 | Wang et al. | |
| 2011/0103499 A1 | 5/2011 | Cheng et al. | |
| 2011/0116364 A1 | 5/2011 | Zhang et al. | |
| 2011/0216705 A1 | 9/2011 | Lee et al. | |
| 2011/0216706 A1 | 9/2011 | Lee et al. | |
| 2013/0265866 A1 | 10/2013 | Yi et al. | |
| 2014/0092851 A1 | 4/2014 | Wang et al. | |

FOREIGN PATENT DOCUMENTS

| | | |
|---|---|---|
| EP | 1 755 355 | 2/2007 |
| EP | 1 973 281 | 9/2008 |
| EP | 2 094 053 | 8/2009 |
| EP | 2 136 599 | 12/2009 |
| JP | 2000341204 A | 12/2000 |
| JP | 2007-266733 | 10/2007 |
| JP | 2008541545 A | 11/2008 |
| JP | 2009-525655 | 9/2009 |
| JP | 2009-303213 A | 12/2009 |
| JP | 2010-518724 A | 5/2010 |
| JP | 2010-541520 | 3/2011 |
| JP | 2011-509049 | 3/2011 |
| JP | 2011-508538 | 10/2011 |
| KR | 10-0567211 | 4/2006 |
| KR | 10-2006-0115175 | 11/2006 |
| KR | 10-2006-0120115 | 11/2006 |
| KR | 10-2007-0107619 | 11/2007 |
| KR | 10-2007-0108300 | 11/2007 |
| KR | 10-2007-0109313 | 11/2007 |
| KR | 10-2008-0016367 | 2/2008 |
| KR | 10-2008-0026583 | 3/2008 |
| KR | 10-2008-0039177 | 5/2008 |
| KR | 10-2008-0039294 | 5/2008 |
| KR | 10-2008-0049596 | 6/2008 |
| KR | 10-2008-0065880 | 7/2008 |
| KR | 10-2008-0112649 | 12/2008 |
| KR | 10-2009-0014937 | 2/2009 |
| KR | 10-2009-0016402 | 2/2009 |
| KR | 10-2009-0084690 | 8/2009 |
| KR | 10-2009-0091669 | 8/2009 |
| RU | 2233546 | 7/2004 |
| RU | 2332802 | 8/2008 |
| WO | WO 2004/056009 | 7/2004 |
| WO | 2006118427 A2 | 11/2006 |
| WO | WO 2007/082407 | 7/2007 |
| WO | WO 2007/083230 | 7/2007 |
| WO | 2007091831 A2 | 8/2007 |
| WO | 2007126301 A1 | 11/2007 |
| WO | WO 2007/128204 | 11/2007 |
| WO | WO 2007/143916 | 12/2007 |
| WO | WO 2008/024628 A2 | 2/2008 |
| WO | WO 2008/042967 | 4/2008 |
| WO | WO 2008/054112 | 5/2008 |
| WO | 2008/100009 A1 | 8/2008 |
| WO | WO 2008/097023 | 8/2008 |
| WO | WO 2008/097030 | 8/2008 |
| WO | WO 2008/131401 | 10/2008 |
| WO | WO 2008/155469 | 12/2008 |
| WO | WO 2009/005429 | 1/2009 |
| WO | WO 2009/023470 | 2/2009 |
| WO | WO 2009/086188 A1 | 7/2009 |
| WO | WO 2009/088858 | 7/2009 |
| WO | WO 2009/096195 A1 | 8/2009 |

OTHER PUBLICATIONS

3GPP TS 36.523-1 V8.0.0, User Equipment (UE) conformance specification, Part 1: Protocol conformance specification, Dec. 2008.
3GPP TSG-RAN2 Meeting #62bis, Correction to MAC PDU Format for Random Access Response, LG Electronics Inc., Apr. 7, 2008, R2-083370.
3GPP TS 36.321 v8.2.0 (May 2008), Technical Specification, "3$^{rd}$ Generation Partnership Project; Technical Specification Group

(56) References Cited

OTHER PUBLICATIONS

Radio Access Network; Evolved Universal Terrestrial Radio Access (E-UTRA) Medium Access Control (MAC) protocol specification (Release 8)", pp. 1-33.
Nokia Siemens Networks, Nokia, "Triggers for Power Headroom Reports in EUTRAN Uplink", 3GPP TSG RAN WG1 Meeting #52bis, Shenzhen, China, Mar. 31-Apr. 4, 2008, R1-081464.
LG Electronics Inc. et al. "Reflection of RAN1 LS on timing adjust and addition of MAC in 3GPP TSG-RAN2 Meeting #64 R2-086374, Nov. 14, 2008 random access response".
Huawei, "Corrections to Random Access Procedure", 3GPP TSG-RAN WG2 Meeting #64 R2-087042, Nov. 14, 2008.
Dalman et al., "3G Evolution HSPA and LTE for Mobile Broadband", Elsevier, edition 2, p. 441 (2008).
Nokia Corporation et al. "Change Request: Message 3 Definition", 3GPP TSG-RAN2 Meeting #64, Oct. 10-14, 2008, Prague, Czech Republic, R2-086077.
LG Electronics Inc. "Change Request: Management for HARQ buffer with TAT", 3GPP TSG RAN2 Meeting #65, Athens, Greece, Feb. 9-13, 2009, R2-090969.
LG Electronics et al. "Change Request: Counter proposal to R2-090969 on Management of HARQ buffer with TAT", 3GPP TSG RAN2 Meeting #65, Athens, Greece, Feb. 9-13, 2009, R2-091232.
3$^{rd}$ Generation Partnership Project; Technical Specification Group Radio Access Network; Evolved Universal Terrestrial Radio Access (E-UTRA) Medium Access Control (MAC) protocol specification (Release 8). 3GPP TS 36.321 V8.3.0 (Sep. 2008).
3$^{rd}$ Generation Partnership Project; Technical Specification Group Radio Access Network; Evolved Universal Terrestrial Radio Access (E-UTRA) Medium Access Control (MAC) protocol specification (Release 8). 3GPP TS 36.321 V8.1.0 (Mar. 2008), XP050323507.
36.321 CR covering agreements for RAN2 #61bis and RAN2#62. 3GPP TSG-RA2 Meeting #62, Kansas City, Mo. May 5-9, 2008, R2-082902.
Ericsson, "Correction to UE transmission power headroom report for LTE", 3Gpp TSG-RAN2 Meeting #63; May 18-22, 2008, Jeju Island, Korea, R2-083897.
A. Ghosh et al., "Random Access Design for UMTS Air-Interface Evolution", IEEE 65$^{th}$ Vehicular Technology Conference, Apr. 22, 2007, pp. 1041-1045.
"3$^{rd}$ Generation Partnership Project; Technical Specification Group Radio Access Network; Evolved Universal Terrestrial Radio Access (E-UTRA) Medium Access Control (MAC) protocol specification (Release 8)" 3GPP TS 36.321 V8.1.0 (Mar. 2008).
Change Request, "3$^{rd}$ Generation Partnership Project; Technical Specification Group Radio Access Network; Evolved Universal Terrestrial Radio Access (E-UTRA) Medium Access Control (MAC) protocol specification (Release 8): 3GPP TS 36.321 V8.1.0 (Mar. 2008)", R2-081719.
LG Electronics, "Message 2 Structure with Back-Off Parameters", 3GPP TSG-RAN WG2 #61, R2-081035, Feb. 2008.
LG Electronics, "Discussion on random access back-off procedure", 3GPP TSG-RAN WG2 #60bis, R2-080189, Jan. 2008.
MSAC Rapporteurs et al., "E-UTRA MAC protocol specification update", 3GPP TSG-RAN2 meTeting #61bis, R2-081719, Apr. 2008.
NTT DoCoMo, Inc., "RA response format", 3GPP TSG RAN WG2 #60bis, R2-080451, Jan. 2008.
LG Electronics Inc., "Missing condition for unsuccessful reception of Msg2", 3GPP TSG-RAN2 meeting #64bis, R2-090323, Jan. 2009.
"3$^{rd}$ Generation Partnership Project; Technical Specification Group Radio Access Network; Evolved Universal Terrestrial Radio Access (E-UTRA) Medium Access Control (MAC) protocol specification (Release 8)", 3GPP TS 36.321, V8.2.0, May 2008, XP050377618.

TS 36.321 V8.1.0, Mar. 2008.
Technical Specification Group Radio Access Network; Evolved Universal Terrestrial Radio Access (E-UTRA) Medium Access Control (MAC) protocol specification; (3GPP TS 36.321, Jun. 2008).
Texas Instruments Inc., "Handover Failure Handling", 3GPP TSG-RAN WG2 Meeeting #61, R2-081504, Feb. 2008.
Alcatel-Lucent, "TP on Power Headroom reporting", 3GPP TSG RAN WG2 #62, R2082224, May 2008.
Nokia Corporation et al., "Power Headroom reporting" 3GPP TSG-RAN WG2 Meeting #62, R2-082197, May 2008.
Ericsson, "UE transmission power headroom report for LTE", 3GPP TSG RAN WG2 #62, R2-082147, May 2008.
Nokia Siemens Network et al., "Triggers for Power Headroom Reports in EUTRAN Uplink", 3GPP TSG RAN WG1 #52 Meeting, R2-080947, Feb. 2008.
Nokia Corporation et al., "Scheduling Information for E-UTRAN uplink", 3GPP TSG-RAN WG2 Meeting #59bis, R2-073909, Oct. 2007.
MAC Rapporteurs, "E-UTRA MAC protocol specification update", 3GPP TSG-RAN2 Meeting #61, R2-081389, Feb. 2008.
Panasonic, "Clarification on 'Active Time' definition", 3GPP TSG RAN WG2 #62, R2-082225, May 2008.
LG Electronics Inc. et al., "Restriction to PDCCH for Contention Resolution", 3GPP TSG-RAN WG2 #62, R2-082509, May 2008.
LG Electronics Inc., "DL Grant in Random Access Response", 3GPP TSG-RAN WG2 #60, R2-074787, Nov. 2007.
ETSI TS 136 300 V8.4.0, "Evolved Universal Terrestrial Radio Access (E-UTRA) and Evolved Universal Terrestrial Radio Access (E-UTRAN); Overall Description; Stage 2", XP014041816, Apr. 2008.
Sunplus mMobile Inc., "Align the DRX Active Time with RA procedure", 3GPP TSG-RAN WG2 Meeting #62bis, R2-083428, Jul. 2008.
LG Electronics Inc., "Correction to DRX", 3GPP TSG-RAN2 Meeting #62bis, R2-083274. Jun.-Jul. 2008.
MAC Rapporteurs, "E-UTRA MAC protocol specification update", 3GPP TSG-RAN2 Meeting #61bis, R2-081719, Mar.-Apr. 2008.
LG Electronics, "Corrections to the Random Access Response reception", 3GPP TSG-RAN WG2 #62, R2-082447, May 2008.
LG Electronics Inc., "Correction to RACH Procedure", 3GPP TSG-RAN2 Meeting #64, R2-086137, Nov. 2008.
LG Electronics Inc., "Correction to Multiplexing Procedure for BSR", 3GPP TSG-RAN2 Meeting #62bis, R2-083275, Jun.-Jul. 2008.
Infineon, "TP for the UL logical channel prioritization", 3GPP TSG RAN WG2 Meeting #62, R2-082504, May 2008.
LG Electronics Inc., "BSR priority", 3GPP TSG-RAN WG2 #61bis, R2-081589, Apr. 2008.
MAC Rapporteurs, "36.321 CR covering agreements of RAN2 #61bis and RAN2#62", 3GPP TSG-RAN2 Meeting #62, R2-082902, May 2008.
Panasonic, "Priority handling of MAC Control Elements", 3GPP TSG RAN WG2#62, R2-082227, XP-002537451, May 2008.
CR Covering agreements of RAN 2 #61bis; 3GPP Draft; R2-082049; XP050139679; Apr. 2008.
Disassembly, Demultiplexing and Multiplexing Functions; #GPP Draft; R2-091633; XP050323507; Feb. 2009.
Ericsson, LG Electronics Inc., Prioritization of MAC control elements[online], 3GPP TSG-RAN WG2#64 R2-087413, Nov. 14, 2008.
Huawei, Discussion of Message 3[online], 3GPP TSG-RAN WG2#60bis R2-080239, Jan. 18, 2008.
Fujitsu: DL Reference Signal Design for 8×8 MIMO in LTE-Advanced, 3GPP TSG-RAN1 #56, R1-090706, Feb. 9-13, 2009.

* cited by examiner

METHOD FOR DETECTING FAILURES OF RANDOM ACCESS PROCEDURES

CROSS-REFERENCE

This application is a continuation of, and claims the benefit of U.S. application Ser. No. 13/896,189 filed May 16, 2013, which is a continuation of U.S. application Ser. No. 13/101,565 filed May 5, 2011 (now U.S. Pat. No. 8,477,634), which is a continuation of U.S. application Ser. No. 12/457,654, filed Jun. 17, 2009 (now U.S. Pat. No. 7,957,298), and claims priority benefit to U.S. Provisional Application No. 61/073,743, filed Jun. 18, 2008, U.S. Provisional Application No. 61/074,998, filed Jun. 23, 2008, and Korean Patent Application No. 10-2009-0053407, filed Jun. 16, 2009 (now Korean Patent No. 10-0980919), the contents of each of the above-identified applications is hereby incorporated by reference herein in its entirety.

BACKGROUND

The present invention relates to an apparatus and method for detecting failures of random access procedures. In the related art, failures of random access procedures were not detected properly. As such, the related art technologies do not sufficiently address such issues, and thus do not offer appropriate solutions.

SUMMARY

The present inventors recognized at least the above-identified drawbacks of the related art. Based upon such recognition, the various features described hereafter have been conceived such that instead of waiting to report about any problems that occur in the RACH procedure, if a RACH procedure failure is detected, such failure is reported immediately to the upper layer (RRC entity), then the MAC entity (sub-layer) performs error correction and the RACH procedure is performed again, which results in less delays.

DETAILED DESCRIPTION

The inventive concepts and features herein are explained in terms of a Long Term evolution (LTE) system or other so-called 4G communication systems, which is an enhancement to current 3GPP technologies. However, such details are not meant to limit the various features described herein, which are applicable to other types of mobile and/or wireless communication systems and methods.

Hereafter, the term "mobile terminal" will be used to refer to various types of user devices, such as mobile communication terminals, user equipment (UE), mobile equipment (ME), and other devices that support various types of wireless communication technologies.

Embodiments of the present invention relate to sending and receiving data between a base station (e.g. Node B, eNB, access point, etc.) and a mobile station (e.g. mobile terminal, UE, user device, etc.) in a Long Term Evolution (LTE) system. Power consumption of the mobile terminal can be reduced to a minimum and a downlink channel can be more effectively monitored because a reception time for the downlink channel is determined according to the characteristics of a preamble for a mobile terminal that performs random access.

Second generation (2G) mobile communications relate to transmitting and receiving voice signals in a digital manner, and include technologies such as CDMA, GSM, and the like. As an enhancement from GSM, GPRS was developed to provide packet switched data services based upon GSM.

Third generation (3G) mobile communications relate to transmitting and receiving not only voice signals, but also video and data. The 3GPP (Third Generation Partnership Project) developed the IMT-2000 mobile communication system and selected WCDMA as its radio access technology (RAT). The combination of IMT-2000 and WCDMA can be referred to as UMTS (Universal Mobile Telecommunications System), which comprises a UMTS Terrestrial Radio Access Network (UTRAN).

As data traffic is expected to increase dramatically, the standardization for 3rd generation mobile communications is underway to establish a Long-Term Evolution (LTE) network that supports greater bandwidth. LTE technologies are employed for an Evolved-UMTS (E-UMTS), which has an Evolved-UTRAN (E-UTRAN) that uses OFDMA (Orthogonal Frequency Division Multiple Access) as its radio access technology (RAT).

Figure 1:
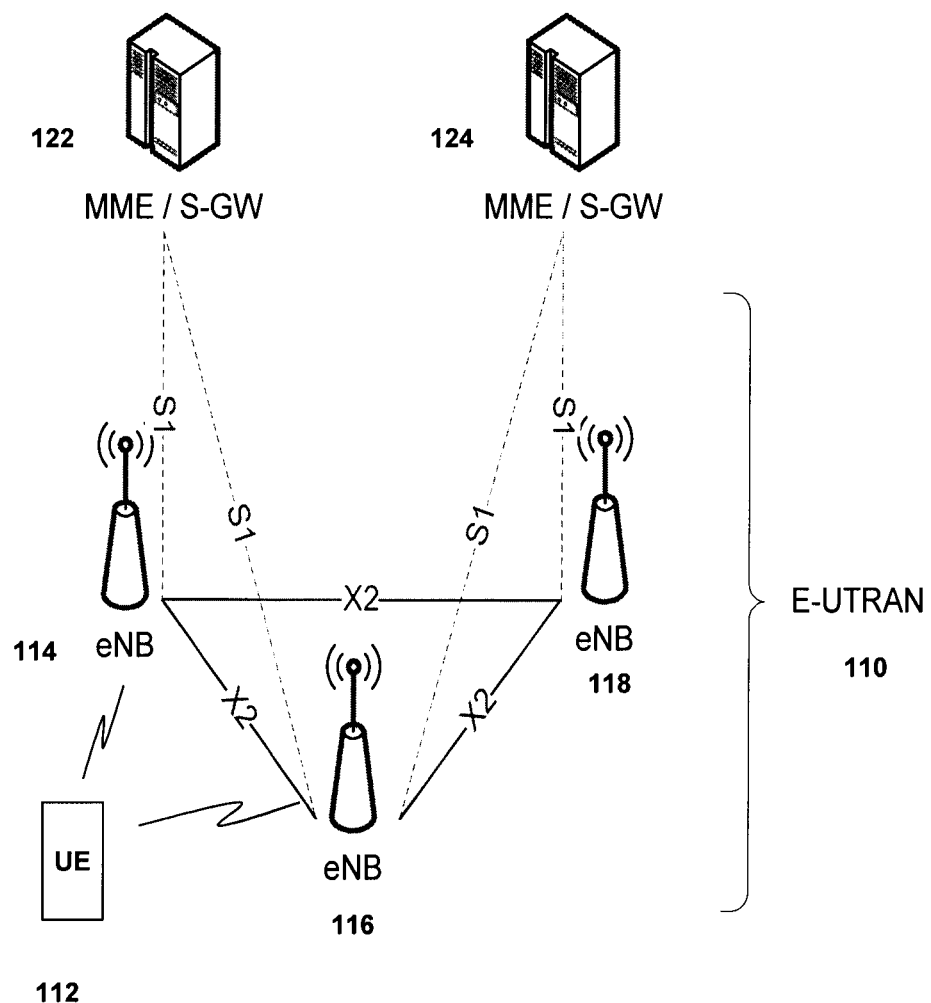
FIG. 1 shows an exemplary network architecture for an E-UMTS (Evolved Universal Mobile Telecommunications System).

FIG. 1 shows the exemplary network architecture for an E-UMTS (Evolved Universal Mobile Telecommunications System) 100, which is a type of mobile communications system. The E-UMTS system is a system that has evolved from the UMTS system and its basic standardization tasks are now being performed by the 3GPP organization. The E-UMTS system can be said to be a Long Term Evolution (LTE) system, which is a type of so-called 4G or next generation system that has evolved from the current 3G mobile communication systems.

The E-UMTS network 100 can be generally distinguished into the E-UTRAN (Evolved Universal Terrestrial Radio Access Network) 110 and the CN (core network). The E-UTRAN is comprised of a mobile terminal 112 (e.g. user equipment (UE), mobile station, handset, mobile phone, etc.), a base station 114, 116, 118 (e.g., an eNode B, access point (AP), network node, etc.) a serving gateway (S-GW) 122, 124 located at an end of the network for connection with an external network, and a mobility management entity (MME) 122, 124 that manages various mobility aspects of the mobile terminal. For a single eNode B, one or more cells (or regions, areas, etc.) may exist.

Figure 2:
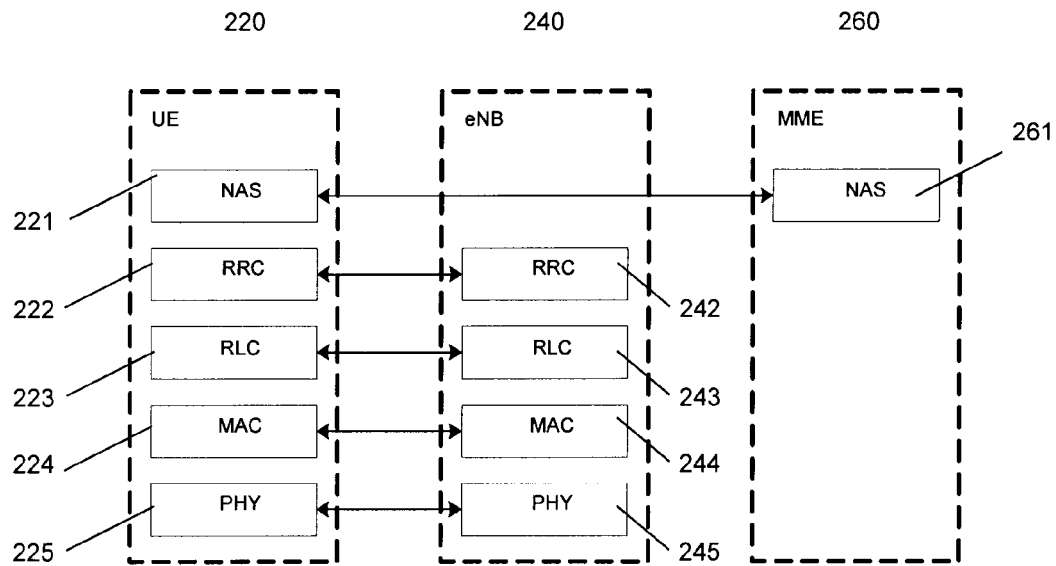
FIG. 2 shows an exemplary radio interface protocol architecture for the control plane between the mobile terminal (UE) and the network (eNB, MME).
Figure 3:
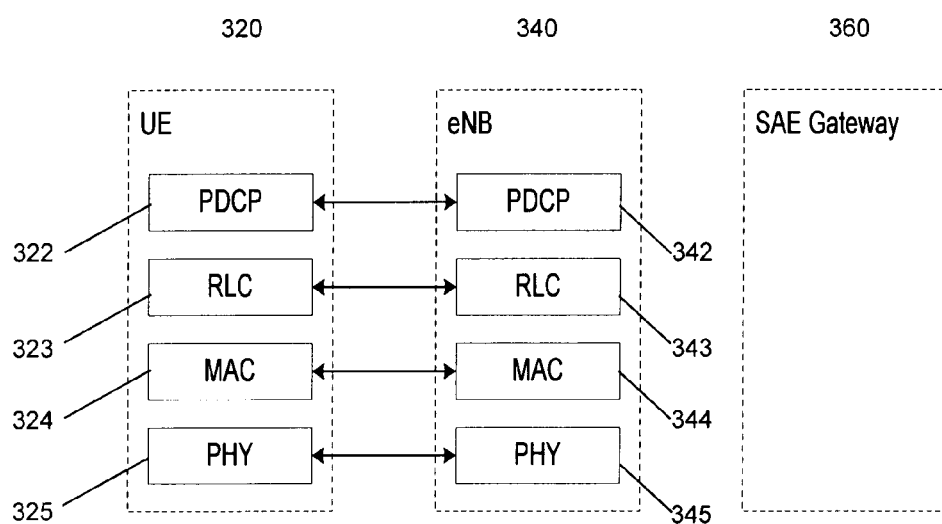
FIG. 3 shows an exemplary radio interface protocol architecture for the user plane between the mobile terminal (UE) and the network (eNB, SAE Gateway).

FIGS. 2 and 3 show the radio interface protocol between the mobile terminal and base station based on the 3GPP radio access network standard. This radio interface protocol is divided horizontally into a physical layer, a data link layer, and a network layer, and is divided vertically into a user plane for transmitting data information and a control plane for transferring control signals (signaling). These protocol layers can be divided into L1 (Layer 1), L2 (Layer 2), and L3 (Layer 3), which are the lower three layers of the OSI (Open System Interconnection) standard model, which is well known in communication systems.

Hereafter, the control plane of the radio protocol in FIG. 2 and the user plane of the radio protocol in FIG. 3 will be described respectively.

In Layer 1, the physical layer 225-245, 325-345 uses one or more physical channels to provide an information transfer service. The physical layer is connected to the MAC (Medium Access Control) layer 224-244, 324-344 located above via one or more transport channels, and data is transferred between the MAC layer and the physical layer through these transport channels. Also, between respectively different physical layers, such as the physical layer in the transmitter (transmitting side) and the physical layer in the receiver (receiving side), data is transferred via one or more physical channels.

The physical channels that exist for the physical layer in the transmitting side and in the receiving side include: SCH (Synchronization Channel), PCCPCH (Primary Common Control Physical Channel), SCCPCH (Secondary Common Control Physical Channel), DPCH (Dedicated Physical Channel), PICH (Paging Indicator Channel), PRACH (Physical Random Access Channel), PDCCH (Physical Downlink Control Channel) and PDSCH (Physical Downlink Shared Channel) and the like.

In Layer 2, the MAC layer provides service to a RLC (Radio Link Control) layer 223-243, 323-343, which is an upper layer, via one or more logical channels. Such logical channels can be classified according to the type of data being transmitted, whereby control channels are used to transmit control plane information and traffic channels are used to transmit user plane information.

The RLC layer supports the transmission of data with reliability. Each radio bearer (RB) guarantees a particular QoS (Quality of Service) and handles the transmission of data associated thereto. In order for the RLC layer to guarantee the QoS that is unique to that RB, one or more RLC entities are provided for each RB. Also, several RLC modes (TM: Transparent Mode, UM: Unacknowledged Mode, AM: Acknowledged Mode) are provided to support various QoS requirements.

The PDCP (Packet Data Convergence Protocol) layer 322-342 in Layer 2 performs a header compression function to reduce the header size for Internet Protocol (IP) packets that contain relatively large and unnecessary control information such that IP packets (such as for IPv4, IPv6, etc.) may be effectively transmitted over the radio interface having relatively small bandwidth. Also, the PDCP layer is used for performing coding of control plane (C-plane) data, such as RRC messages. The PDCP layer can also perform coding of user plane (U-plane) data.

Located at the uppermost portion of Layer 3, the RRC (Radio Resource Control) layer 222-242 is only defined in the control plane and is responsible for the control of logical channels, transport channels and physical channels with relation to the configuration, re-configuration and release of radio bearers (RBs). Here, a radio bearer is a service provided by Layer 2 for transferring data between the mobile terminal and E-UTRAN.

Figure 4:
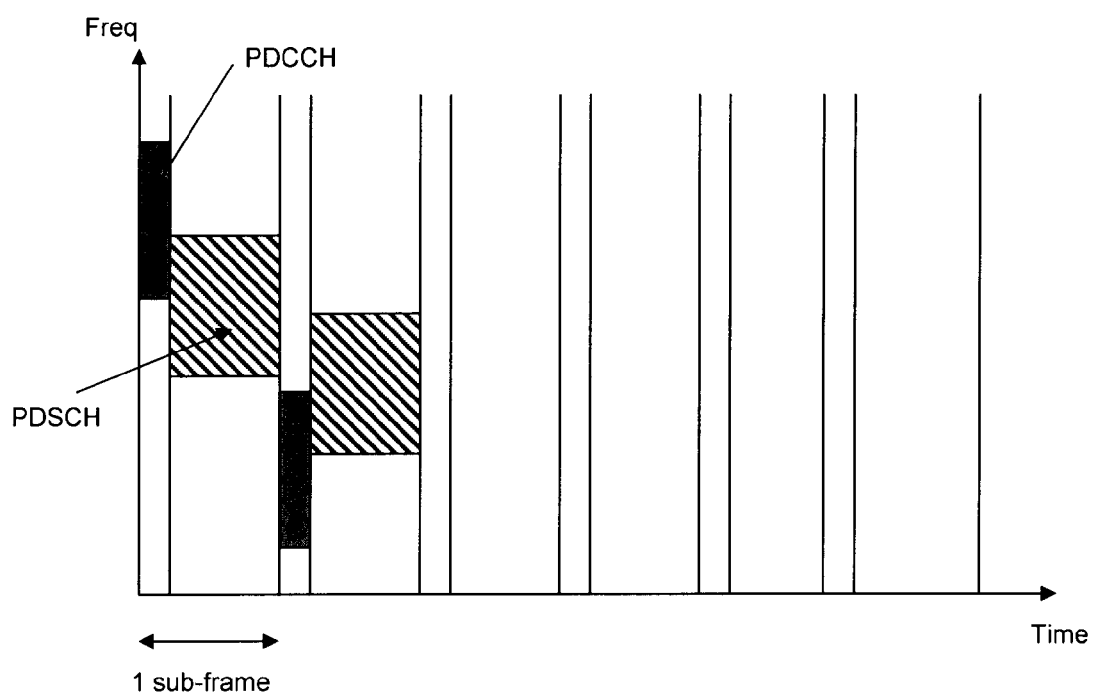
FIG. 4 shows an exemplary signal flow diagram of a contention based random access procedure between the mobile terminal (UE) and the base station (eNB).

With reference to FIG. 4, a method for the mobile terminal in an LTE system to receive downlink data will be explained.

On the downlink, there are basically two types of physical channels: PDCCH and PDSCH. The PDCCH is not directly related to transmitting user data, but used in transmitting control information needed for implementing (or using) physical channels. In more basic terms, it can be said that the PDCCH is used in controlling other physical channels. In particular, the PDCCH is used in transmitting information necessary for the mobile terminal to receive the PDSCH. With respect to data that is transmitted at a particular point in time using a particular frequency bandwidth, information about what mobile terminal such data is intended for, the size of such data being transmitted, and the like is transmitted via the PDCCH. Accordingly, each mobile terminal receives the PDCCH at a particular time (e.g., TTI: transmission time interval) and checks whether any data (that should be received) was transmitted. If there is an indication that data (which should be received) was indeed transmitted, the PDSCH is additionally received by using the information (such as the appropriate frequency, etc.) indicated by the PDCCH. It can be said that information indicating as to what mobile terminal (i.e. a single UE or multiple UEs) the data of the PDSCH is being transmitted to, information indicating how the mobile terminal(s) should receive and decode the PDSCH data, and the like are transmitted via a physical channel, i.e. the PDCCH (Physical Downlink Control CHannel).

For example, in a particular sub-frame, let us assume that radio resource information A (e.g. frequency location), transmission format information B (e.g. transmission block size, modulation and coding information, etc.), and RNTI (Radio Network Temporary Identity) information C undergo CRC (Cyclic Redundancy Check) masking and transmitted via the PDCCH. One or more mobile terminals in a corresponding cell use the RNTI information that it has in order to monitor the PDCCH, and referring to the above assumption, for a mobile terminal having RNTI information C, when the PDCCH is decoded, CRC errors do not occur. Accordingly, such mobile terminal uses the transmission format information B and radio resource information A to decode the PDSCH in order to receive data. In contrast, with respect to the above assumption, in a mobile terminal that does not have RNTI information C, CRC errors occur when the PDCCH is decoded, and thus such mobile terminal does not receive the PDSCH.

Through the above procedures, in order to inform about which mobile terminals have been allocated radio resources, a RNTI (Radio Network Temporary Identifier) is transmitted via each PDCCH, and such RNTI can be classified as a dedicated RNTI or a common RNTI. A dedicated RNTI is allocated to a single mobile terminal and is used for transmitting and receiving data corresponding to that mobile terminal. Such dedicated RNTI is only allocated to those mobile terminals having their information registered in the base station (eNB). In contrast, a common RNTI is used by those mobile terminals that do not have their information registered in the base station (eNB) and cannot be allocated a dedicated RNTI, in order to send and receive data with the base station or used for transmitting information (such as system information) that is commonly applied to a plurality of mobile terminals.

Meanwhile, the two main elements that comprise the E-UTRAN are the base station and the mobile terminal. The radio resources for a single cell are comprised of uplink radio resources and downlink radio resources. The base station is responsible for the allocation and control of uplink radio resources and downlink radio resources of a cell. Namely, the base station determines what radio resources are to be used by what mobile terminals at certain moments in time. For example, the base station can determine that 3.2 seconds from now, the frequency from 100 Mhz to 101 Mhz will be allocated to user 1 for a duration of 0.2 seconds to allow downlink data transmissions. Also, after the base station makes such determination, these matters can be informed to the corresponding mobile terminal such that this mobile terminal receives downlink data Likewise, the base station can determine when a certain mobile terminal should use what amount of which radio resources for data transmission via the uplink, and the base station informs the mobile terminal about its determination, to thus allow the mobile terminal to transmit data during the determined time period using the determined radio resources.

Unlike the related art, if the base station manages radio resources in a dynamic manner, efficient use of radio resources would be possible. Typically, a single mobile terminal continuously uses a single radio resource during a call connection. This is not preferable considering that most recent services are IP packet-based. The reason is that most packet services do not continuously generate packets during the duration of a call connection, and there are many time periods in which nothing is transmitted during the call. Despite this, continued allocation of a radio resource to a single mobile terminal is inefficient. To solve this, the mobile terminal of a E-UTRAN system uses a method in which radio resources are allocated to the mobile terminal only while service data exists.

Hereafter, aspects of the RACH (Random Access CHannel) procedure will be explained. The RACH procedure is used for transmitting relatively short length data via the uplink. In particular, the RACH is used when there is a signaling message or user data to be transmitted via the uplink by a mobile terminal that did not receive allocation of dedicated radio resources, or may also be used when the base station should instruct the mobile terminal to perform a RACH procedure.

Next, the random access procedure provided in an LTE system will be explained. The random access procedure provided in the LTE system can be classified as a contention based random access procedure and a non-contention based procedure. Such classification is based upon whether the random access preamble is selected by the mobile terminal itself (i.e. preamble selected by the MAC in the mobile terminal) or selected by the base station (i.e. receiving information about the preamble to be used through explicit signaling).

In a non-contention based random access procedure, the mobile terminal uses the preamble that was directly allocated to it from the base station. Thus, if the base station had allocated a particular random access preamble to the mobile terminal, such random access preamble is only used by that mobile terminal, while other mobile terminals do not use such random access preamble. Accordingly, because there is a one-to-one (1:1) relationship between the random access preamble and the mobile terminal that uses such random access preamble, there are no contentions (or conflicts) between multiple mobile terminals. In such case, upon receipt of such random access preamble, the base station can immediately know which mobile terminal transmitted such random access preamble, and thus it can be said that more efficient operation is possible.

In contrast, for a contention based random access procedure, because the mobile terminal sends transmission upon selecting a particular random access preamble among those that may be used, there is the possibility that multiple mobile terminals use the same random access preamble. Thus, even upon reception of a particular random access preamble, the base station cannot accurately know which mobile terminal transmitted on such random access preamble.

The mobile terminal performs a random access procedure for at least the following exemplary situations:
- upon performing an initial access when there is no radio resource control (RRC) connection with the base station;
- upon initial access to a target cell while the mobile terminal is in handover;
- upon request by a command of the base station;
- upon generation of data for the uplink, when uplink time synchronization is not correct or when designated radio resources to be used in appropriate requesting radio resources have not yet been allocated;
- during a correction (e.g. decoding, reconstruction, recovery, etc.) procedure when there is a radio link failure or handover failure.

Figure 5:
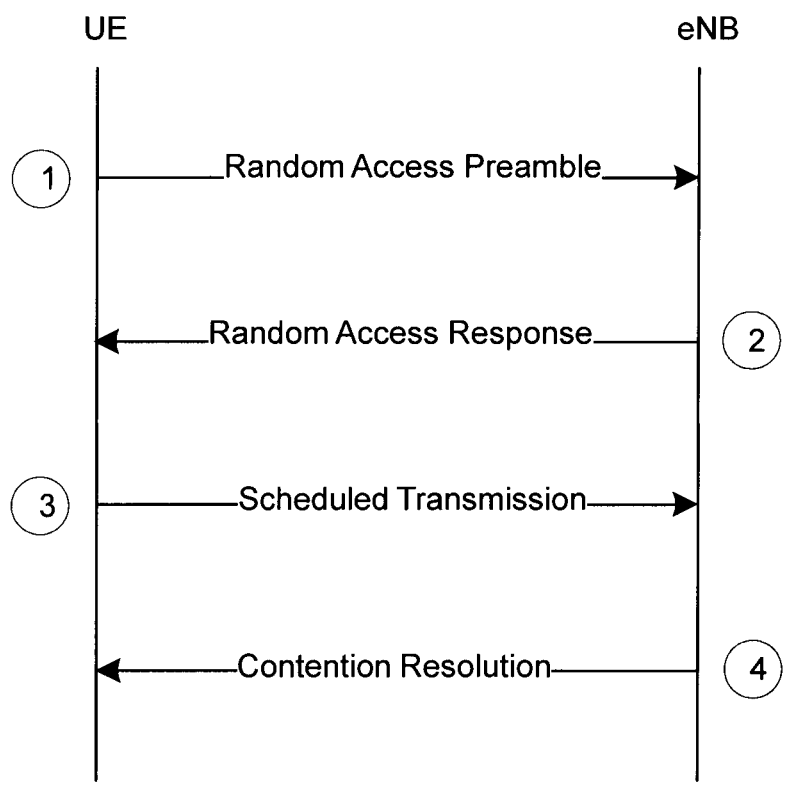
FIG. 5 shows an exemplary relationship among certain channels (PDCCH and PDSCH) between the base station and mobile terminal.

Based upon the above explanations, the operations between the mobile terminal and the base station for a contention based random access procedure will be explained with reference to FIG. 5 (that includes steps 1 through 4).

Step 1)

In a contention based random access procedure, the mobile terminal selects (e.g. at random) one random access preamble among a set of random access preambles indicated via system information or a handover command, then selects PRACH resources that can be used to transmit such random access preamble, and then performs transmission. Here, such preamble is called a RACH MSG 1. When the mobile terminal itself ("randomly") selects the preamble (i.e. the preamble selected by the MAC itself), such is called a contention-based RACH procedure, and the preamble is called a contention-based preamble. If the mobile terminal receives allocation of the preamble directly from the network through the RRC or PDCCH (i.e. an explicitly signaled preamble), this is called a non-contention based RACH procedure, and such preamble is called a dedicated preamble.

Step 2)

After transmitting the random access preamble as selected above, the mobile terminal attempts to receive its random access response within a random access response reception window indicated from the base station via system information or handover command. In more detail, the random access response information (typically called a RACH MSG 2) is transmitted in the form of a MAC PDU, which is delivered via the PDSCH, and the information related to the radio resources for the PDSCH is delivered through the PDCCH via the RA-RNTI.

The random access response includes values comprising a random access preamble identifier (ID), a UL Grant (for uplink radio resources), a Temporary C-RNTI (a temporary cell identifier), and a Time Alignment Command (a value for time synchronization adjustment).

If the random access preamble identifier (ID) is the same as (i.e. matches) the random access preamble transmitted in step 1) above, especially while a contention based random access preamble procedure is in progress, the mobile terminal uses the information related to the uplink radio resources and performs the following step 3). If a dedicated preamble is used in step 1), and if the random access preamble identifier (ID) included in RACH MSG 2 and the random access preamble transmitted by the mobile terminal in step 1) are the same (i.e. matches), the RACH procedure is considered to be ended or terminated.

Step 3)

If the mobile terminal receives a random access response (RAR) that is meant for itself (i.e. the RAR is a valid response for that mobile terminal), the information within such random access response is processed, respectively. Namely, the mobile terminal applies the Time Alignment Command and stores the Temporary C-RNTI. Also, the UL Grant is used to transmit the data stored in its buffer or to transmit newly generated data to the base station. Here, the data transmitted by using the UL Grant (i.e., the MAC PDU) is commonly called RACH MSG 3. Among the data (i.e. RACH MSG 3) included in the UL Grant, the mobile terminal identifier (ID) must be included. This is because in a contention based random access procedure, the base station cannot determine which mobile terminal performed such random access procedure, and in order to prevent or resolve any future contentions or conflicts, information that can be used to identify the mobile terminal would be required.

In the above procedure, there are two ways to include the identifier for the mobile terminal. For the first way, if the mobile terminal already has a valid cell identifier (C-RNTI) allocated from the base station (eNB) of the corresponding cell before the random access procedure is performed, the mobile terminal transmits such cell identifier via the UL Grant. For the second way, if the mobile terminal did not receive allocation of a unique cell identifier from the eNB, the mobile terminal includes its core network identifier (e.g., S-TMSI, Random ID, etc.) and performs transmission. After transmitting data using the UL Grant, the mobile terminal starts a contention resolution timer in order to solve any contention (conflict) problems.

Step 4)

After transmitting data (that includes its identifier) using the UL Grant included in the random access response, the mobile terminal waits for commands from the base station for resolving contentions. Namely, reception of the PDCCH is attempted in order to receive a particular message. There are two ways to receive the PDCCH. As stated previously, if the identifier transmitted by using the UL Grant is a cell identifier (C-RNTI) allocated to the mobile terminal from the eNB, the mobile terminal attempts reception of the PDCCH by using its cell identifier, and if the identifier is an identifier that was allocated through the core network, attempt to receive the PDCCH is performed by using the Temporary C-RNTI included in the random access response.

Afterwards, for the former case (i.e. C-RNTI), if the PDCCH (referred to a RACH MSG 4 hereafter) is received (by using its cell identifier) before expiration of the contention resolution timer, then it is considered that the mobile terminal performed the ransom access procedure in a normal manner and the random access procedure is ended (terminated). For the latter case (i.e. Temporary C-RNTI), if the PDCCH was received through the temporary cell identifier before expiration of the contention resolution timer, the data (referred to as RACH MSG 4 hereafter), which is delivered by the PDSCH that is indicated by the PDCCH, is checked. If such data contains a unique identifier for the mobile terminal itself, it is considered that the mobile terminal performed the random access procedure in a normal manner, and the random access procedure is ended (terminated). The message or MAC PDU received in this step 4) is commonly called RACH MSG 4.

Step 5)

In case the contention resolution timer has expired (i.e., a Temporary C-RNTI or a cell identifier for the mobile terminal is not received before expiration of the contention resolution timer), the mobile terminal considers the RACH procedure to be a failure. As a result, an appropriate back-off timer is operated (started) and the RACH procedure beginning from step 1) above is started again after expiration of such back-off timer.

With reference to the technical description thus far, the technical solution provided by the embodiments of the present invention can be described as follows.

The mobile terminal receives parameters, which are to be used in the RACH procedure, from the upper layer (i.e. the RRC layer) during the initialization time of a call. However, as described above, the RACH procedure is used by a mobile terminal (which has not received allocation of dedicated radio resources) in order to request resources from the base station. Because the RACH procedure is used by an unspecified mobile terminal to request the base station for allocation of radio resources, the various parameters related to the physical channels and the like used for the RACH procedure are not optimized for any particular mobile terminal, but are set based on estimate values and the like upon considering the average for multiple mobile terminals. This means that the parameters used for the RACH procedure are not optimal for each respective mobile terminal, and thus there is a high probability of failure for the RACH procedure. Accordingly, the RACH procedure started by the mobile terminal should generally be repeated several times until success is actually achieved.

However, for a mobile terminal located in a specific area or in a particular state, repeated attempts of the RACH procedure results in a waste of radio resources or cause delays in data delivery. For example, for a mobile terminal located at the boundary region of two adjacent cells, and if the mobile terminal has accessed a cell that has a detrimental signal environment, when the RACH procedure attempts are continuously repeated, such mobile terminal will have a high probability of experiencing continuous RACH procedure failures.

Due to such reasons, if the RACH procedure fails, it would be better if the mobile terminal performs cell reselection or re-attempts call establishment. To do so, the MAC entity has a counter that counts the number of times that a particular RACH procedure has been attempted. Also, if the number of RACH procedure attempts exceeds a particular threshold, the MAC entity informs the RRC entity that there is a problem in the PRACH procedure.

Figure 6:
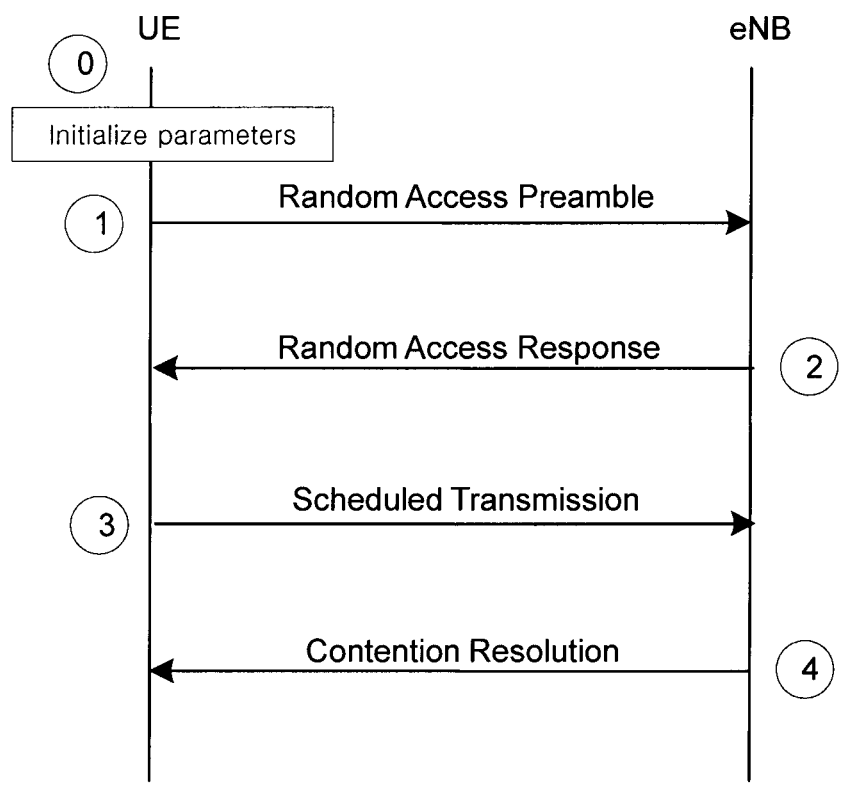
FIG. 6 shows a signal flow diagram according to an exemplary embodiment.

The RACH procedure will be further explained as follows with reference to FIG. 6 (that includes steps 0 through 4) and FIG. 7.

Step 0)

The MAC entity receives, from the upper layer (RRC), parameters related to the RACH procedure and initializes the variables related to the RACH procedures. In this process, the Preamble Transmission counter value is initialized. A Preamble Transmission maximum value is received from the upper layer.

Step 1)

A RACH Preamble is selected. The Preamble Transmission counter value is compared with the Preamble Transmission maximum value. If the Preamble Transmission counter value equals the Preamble Transmission maximum value+1, the RRC entity is informed that the RACH procedure has problem. The selected RACH Preamble is transmitted.

Step 2)

A RACH Response (RAR) with respect to the RACH Preamble transmitted in step 1) is received. If the RACH Response reception fails, the Preamble Transmission counter value is increased by 1, and a back-off time is applied if necessary, and the process returns back to step 1).

Step 3)

Transmission is performed based upon the radio resource information indicated in the received RACH Response.

Step 4)

Contention resolution is performed by using a timer, mobile terminal identifiers, and the like. If contention resolution fails, the Preamble Transmission counter value is increased by 1, and a back-off time is applied if necessary, and the process returns back to step 1).

Figure 7:
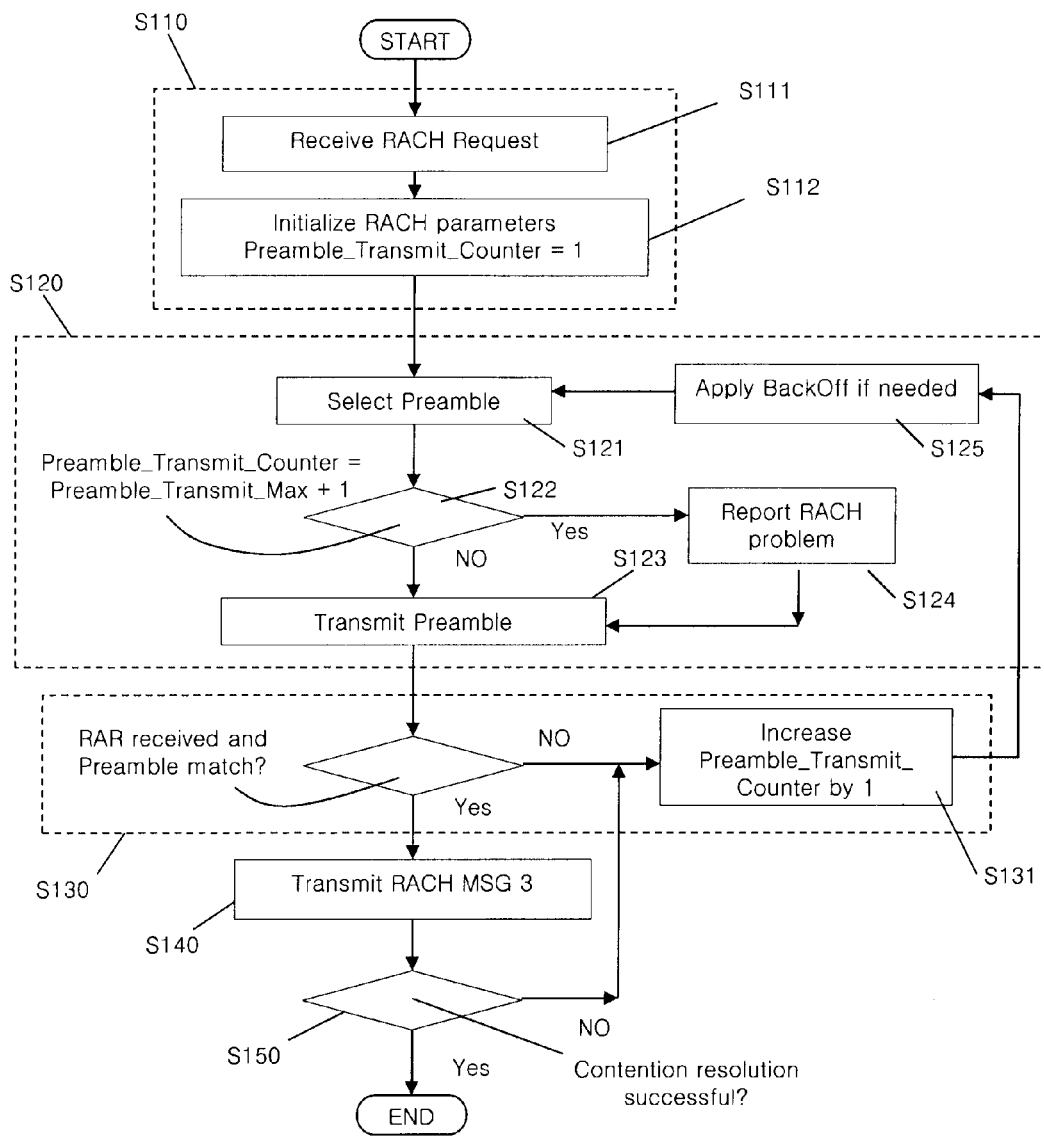
FIG. 7 shows a flow chart according to an exemplary embodiment.

FIG. 7 shows a flowchart of an exemplary RACH procedure operation of according to a first embodiment.

Upon starting the RACH procedure, reception and initialization is performed (S110). Namely, the MAC layer (entity) of the UE receives a RACH request from the network (i.e. an upper layer) (S111). Thereafter, the RACH parameters are initialized and the preamble transmit counter is set to 1 (S112).

Here, the transmit (transmission) counter for the random access preamble (or RACH preamble) is initialized. Also, a preamble transmission maximum value is received from the upper layer.

Next, procedures regarding the RACH preamble are performed (S120). Namely, the UE MAC selects a RACH preamble (S121) among a set of preambles delivered from the upper layer (RRC). Here, the RACH preamble is also known as RACH MSG 1. If the UE has selected the RACH preamble at random, such is referred to as a contention based RACH procedure, while such selected preamble is called a contention based preamble. Then, the preamble transmit counter value is compared with the preamble transmit maximum value+1 (S122). If the preamble transmit counter value is less than the preamble transmit maximum value+1, then the preamble is transmitted (S123). However, if the preamble transmit counter value equals the preamble transmit maximum value+1, then a RACH problem is reported to the upper layer (RRC) (S124).

After transmitting the selected preamble, the UE (100) checks to see if a random access response (RAR: RACH response with respect to the transmitted preamble) indicated from the eNB (200) via system information or handover command is received within a response reception window or a TTI window (S130).

Namely, the RAR is transmitted in the form of a MAC PDU and delivered via a PDSCH (Physical Downlink Shared CHannel). Also, control information is transmitted via the PDCCH (Physical Downlink Control CHannel) to allow the UE to appropriately receive the PDSCH. Thus, the PDCCH information includes information about the UE that should receive the PDSCH, information about the frequency and time of the radio resources for the PDSCH, and information about the transmission format of the PDSCH.

If the UE successfully receives the PDCCH, the RAR delivered via the PDSCH can be appropriately received by using the PDCCH information. Here, the RAR includes a RACH ID, UL grant, Temporary C-RNTI, and Time Alignment commands.

If the UE successfully received the RAR and a preamble match is verified, a RACH MSG 3 is transmitted (S140). However, if either the RAR is not received or if there is no preamble match, then the preamble transmit counter is incremented by 1 (S131) and the procedure returns back to preamble selection (S121). Here, a back-off time may be applied if needed (S125).

Upon successfully receiving the RAR, the UE then proceeds to process the information included therein. Also, by using the UL grant, the UE (100) sends to the eNB (200) the data stored in its buffer or newly generated data (S140). Here, the data delivered via the UL grant is called RACH MSG 3. Among the data included in the UL grant, a UE identifier must be included. Such data is delivered via the CCCH (Common Control CHannel) in the form of an SDU. Also, such data is delivered via a MAC Control Element that includes a C-RNTI.

Thereafter, the UE starts a timer related to whether or not transmission was successful, and waits for a response with respect to such transmitted data. Before the timer expires, if a response that includes the UE ID is received (i.e. if contention resolution is successful), the data transmission is considered to be successful (S150). Thus, such reception of a response means that a contention resolution identity MAC control element has been received. Alternatively, it may mean that the C-RNTI was received by the UE via the PDCCH or mean that new uplink resources have been allocated.

However, if a response is not received upon expiry of the timer or if the UE does not receive a response that includes the UE ID, then the preamble transmit counter is increased by 1 and the process returns to step S121, with a back-off time being applied if necessary.

Meanwhile, if the RACH procedure continues to fail, the UE should re-select a cell or re-attempt the call connection. To do so, the MAC entity in the UE includes a counter means, which counts how many times the RACH procedure had been attempted. If a certain number of attempts have been made but without success, a problem in the RACH procedure may be reported to the RRC (upper) layer.

In such RACH procedure operation, the mobile terminal, with respect to the selected RACH preamble, performs a comparison value (prior to transmitting the RACH preamble) between the Preamble Transmission counter value and the Preamble Transmission maximum. If the Preamble Transmission counter value exceeds the Preamble Transmission maximum, it is reported to the upper layer that there is a problem in the RACH procedure. In actuality, the operations of steps 1 through 4 are repeated for the RACH procedure, and in step 1) of the first embodiment, the MAC entity determines whether there are any problems in the RACH procedure, and if there is a problem, such is reported to the upper layer.

However, the first embodiment does not consider variables or circumstances such as back-off time, and thus results in inefficient RACH recovery (or restoration) procedures. Namely, in the first embodiment, at the time when the RACH procedure fails, it is not checked as to how many times the RACH procedure has failed. Instead, the number of failures of the RACH procedure is checked only at the time when step 1) is newly performed in order to determine whether there is a problem in the RACH procedure. Accordingly, from the time when a failure is detected, and depending upon the time period required until step 1) of the RACH procedure begins, the mobile terminal requires time to conclude that the RACH procedure has a problem and reporting to the upper layer about such problem is delayed. If the mobile terminal is within a detrimental radio environment, such as when the user (with his mobile terminal) is within an elevator, traveling through a tunnel, etc., there is an increase in the probability of various types of problems occurring, such as delays in performing re-access to a cell having a better quality signal environment, disconnection of the call, suffering data loss, or the like.

Namely, the first embodiment is implemented on the basis of the most favorable conditions, whereby there is no time gap or delay from when a RACH procedure failure is detected until a new step 1) of the RACH procedure is performed. But in actuality, i.e., under less favorable conditions, problems may arise. Under realistic conditions, the back-off time results in a time delay between the time when RACH procedure failure is detected and when a new RACH procedure step 1) is performed. Also, radio resources that can be used for transmitting the RACH preamble are allocated at periodic time intervals (e.g. the fastest allocation occurring at every 10 ms). So, depending on when the mobile terminal detects the RACH procedure failures during such 10 ms interval, the actual time delay until step 1) is re-performed can vary.

Here, the back-off time refers to the time period during which the mobile terminal must wait until the next RACH procedure begins after a failure in a current RACH procedure is detected. Such back-off time is useful if the there is a high number of mobile terminals performing RACH procedures for a certain cell. Namely, in case of a congested cell, when numerous mobile terminals respectively perform continuous RACH procedures without any waiting time, the RACH attempts for each mobile terminal will continue to fail. To avoid such situations, it would be advantageous if some mobile terminals briefly wait to perform subsequent RACH procedure attempts, such that the number of mobile terminals attempting to transmit their RACH preambles at the same time can be reduced, which results in less congestion.

Figure 8:
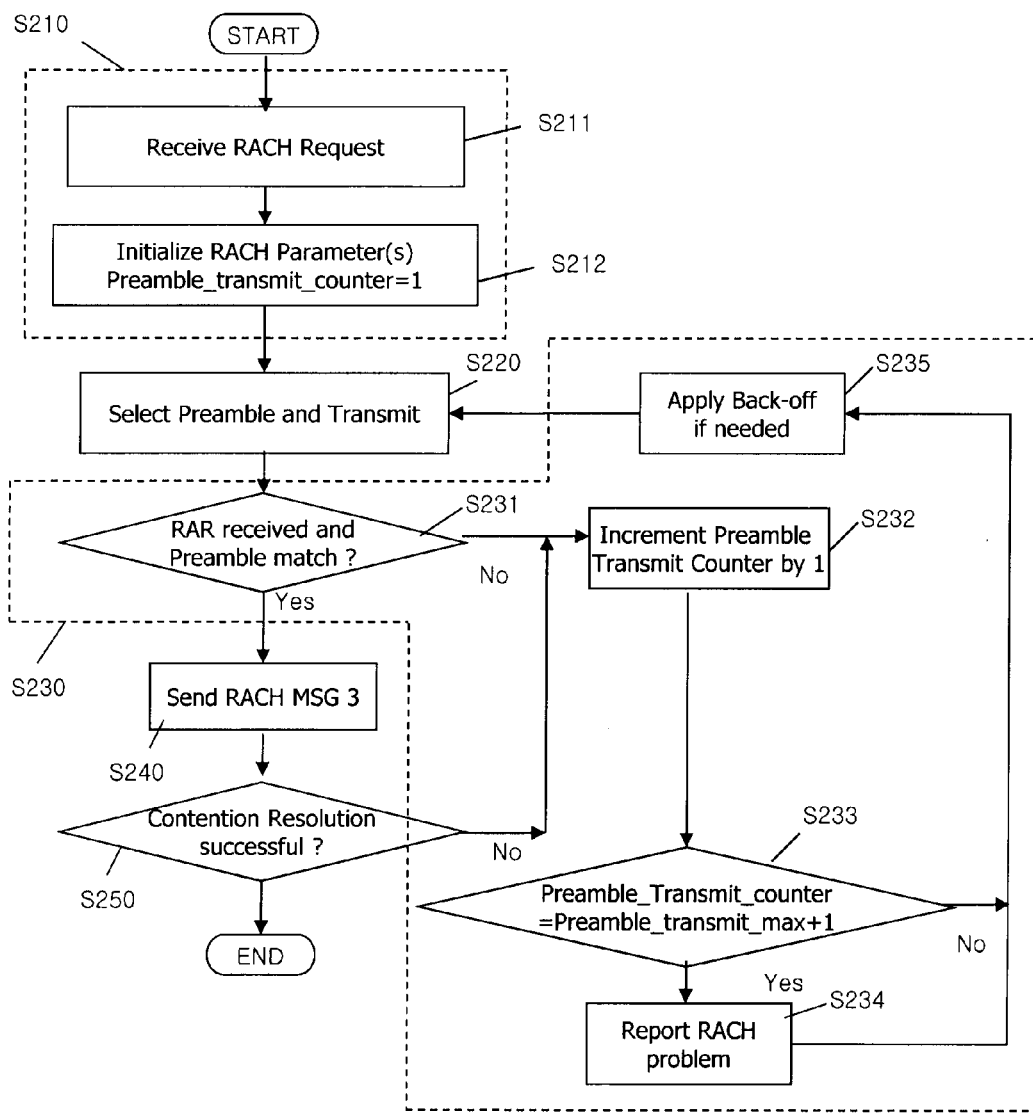
FIG. 8 shows a flow chart according to another exemplary embodiment.

To address such problems, a second embodiment (as shown in FIG. 8) provides a faster procedure for determining whether there are any problems in the RACH procedure, and if there is a problem, such can be reported to the upper layer more quickly and handled more effectively, which results in improved call quality. In more detail, in order to quickly determine whether or not the RACH procedure has a problem, it is proposed that failures in the RACH procedure are to be used.

If a failure occurs in the RACH procedure, certain operations are performed according to such failure. Also, it is determined whether the problem in the RACH procedure occurred at the point in time of such failure, and according to such determination, the occurrence of such problem is reported to the upper layer.

A failure in the RACH procedure may denote the situation when the mobile terminal fails its contention resolution procedure. Also, a failure in the RACH procedure may denote the situation when the mobile terminal, having transmitted a RACH Preamble, does not receive a RACH Access Response (RAR) with respect to the RACH Preamble within a particular time period.

Determining whether a problem in the RACH procedure occurs may denote a comparison between the number of RACH cycles performed by the mobile terminal and the maximum value for RACH cycles. If the mobile terminal performed more RACH cycles than the maximum number of RACH cycles, it is determined that there is a problem in the RACH procedure. If the number of RACH cycles performed by the mobile terminal equals the maximum number of RACH cycles+1, it is determined that there is a problem in the RACH procedure.

The number of RACH cycles is the Preamble Transmission counter value. The RACH cycle maximum value is the Preamble Transmission max value. The RACH cycle number is initialized when instructions are received from the MAC entity or from an external source to perform the RACH procedure.

Failure of contention resolution means that contention resolution has not succeeded upon expiration of contention resolution time. Success of contention resolution means the situation where, if the mobile terminal transmitted a CCCH SDU, the corresponding contention resolution identity MAC control element is received. Success of contention resolution means the situation where, if the mobile terminal transmitted a C-RNTI MAC Control element, the C-RNTI of the mobile terminal is received via the PDCCH and new uplink radio resources are allocated.

The RACH procedure according to the second embodiment will be further explained as follows with reference to FIG. 8 (that includes steps 0 through 4).

Step 0)

The MAC entity receives, from the upper layer, parameters related to the RACH procedure and initializes the variables related to the RACH procedures. In this process, the Preamble Transmission counter value is initialized. A Preamble Transmission maximum value is received from the upper layer.

Step 1)

A RACH Preamble is selected. The selected RACH Preamble is transmitted.

Step 2)

A RACH Response (RAR) with respect to the RACH Preamble transmitted in step 1) is received. If the RACH response is not received within the specified time period or if the received RACH response does not include a value that matches the preamble transmitted by the mobile terminal, the preamble transmission counter value is increased by 1. Also, the preamble transmission counter value is compared with the preamble transmission maximum value. If the preamble transmission counter value equals the preamble transmission maximum value+1, the RRC is informed that a RACH problem has occurred. Also, after a back-off time is applied if necessary, the process returns and begins again from step 1).

Step 3)

Transmission is performed based upon the radio resource information indicated in the RACH Response received in step 2).

Step 4)

Contention resolution is performed by using a timer, mobile terminal identifiers, and the like. If contention resolution fails, the Preamble Transmission counter value is increased by 1. Also, the preamble transmission counter value is compared with the preamble transmission maximum value. If the preamble transmission counter value equals the preamble transmission maximum value+1, the RRC is informed that a RACH problem has occurred. Also, after a back-off time is applied if necessary, the process returns and begins again from step 1).

In more detail, FIG. 8 shows an exemplary operation according to the embodiments described herein. As can be seen, it is checked whether a RACH problem can be determined right at the time when RACH procedure failure is detected, and such is reported to the upper layer. Accordingly, as a result, by allowing the mobile terminal to quickly detect RACH problems, such problems in the RACH procedure can be quickly resolved, and call reliability can be increased.

In the second embodiment, the steps S210, S211, S212 and S220 are the same as or similar to the steps S110, S111, S112 and S121 of the first embodiment. However, the following procedures labeled as S230 (that includes S231, S231, S233, S234, S235) and S240 and S250 are a bit different in their sequence of being performed.

Namely, after the preamble is selected and transmitted (S220), a check as to whether the RAR is received and whether there is a preamble match are performed (S231). If both conditions are satisfied, a RACH MSG 3 is transmitted (S240), then contention resolution is performed (S250).

If both conditions in S231 (i.e. RAR received and preamble match) are not satisfied, or if contention resolution is unsuccessful at S250, the process goes to step S232, in which the preamble transmit counter is incremented by 1.

Then, the preamble transmit counter is compared with the preamble transmit counter maximum value+1. If these two values are equal, a RACH problem is reported to the upper layer (RRC) (S234) and the process returns to S220 (i.e. preamble selection and transmission). Otherwise, namely, if the preamble transmit counter is not equal to the preamble transmit counter maximum value+1, then the process returns to S220. Here, a back-ff time may be applied if necessary (S235).

As a result of the second embodiment, a faster procedure for determining whether there are any problems in the RACH procedure is achieved, and if there is a problem, such can be reported to the upper layer more quickly and handled more effectively.

Figure 9:
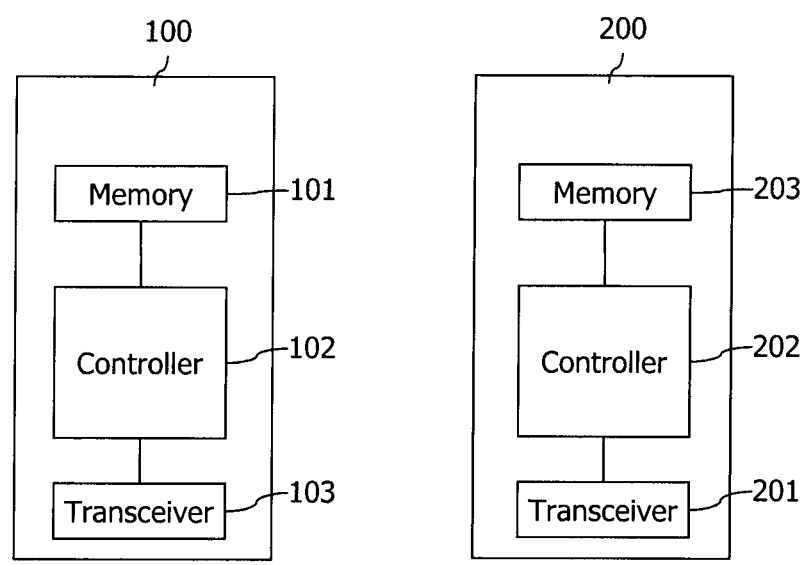
FIG. 9 shows the structural block diagram of a UE (100) and eNB (200) according to the exemplary embodiments.

FIG. 9 shows an exemplary structure block diagram of a UE (100) and eNB (200) according to the first and second embodiments.

The UE comprises a storage means (101), a control means (102) and a transceiver (103). Similarly, the eNB comprises a storage means (201), a control means (202) and a transceiver (203). Such storage means (101, 201) may be configured to store the procedures as shown in FIGS. 6 through 8 for the first and second embodiments. The control means (102, 202) provide control to the storage means (101, 201) and the transceivers (103, 203), such that the procedures stored in the storage means (101, 201) are performed with appropriate signal transmission and reception via the transceivers (103, 203).

Some more details about the concepts and features of the inventive embodiments described herein can also be summarized as follows.

The DRX Command MAC CE may be used to put a UE directly into either short or long DRX Cycle. But when a DRX Command MAC CE is received while the DRX Short Cycle Timer is running, the timer should not be affected. If the timer is started again (i.e. re-started), the UE is further put in wake-up state, causing more battery consumption. This situation can occur when HARQ Re-transmission Grant for a MAC PDU which includes the DRX Command MAC CE is received while the Short DRX Cycle Timer is running. Here, the terms "start" and "re-start" may be distinguished such that "start" is used when the timer is not running, while "re-start" is used when the timer is running. Thus, when the Short DRX Cycle Timer is running, it cannot be started, but it can be restarted.

However, such potential problem may be avoided by implementing the following concept: when DRX Command MAC CE is received while Short DRX Cycle Timer is running, the MAC CE is ignored.

The Active Time may include "a PDCCH indicating a new transmission addressed to the C-RNTI or Temporary C-RNTI of the UE has not been received after successful reception of a Random Access Response (RAR)." This would cover the period between the time of RAR reception and the time of starting the contention resolution timer. Otherwise, the UE would monitor the DL channels longer than needed. For example, even after the contention resolution timer expires due to reception of no temporary C-RNTI, the UE would still monitor the DL channels.

However, such potential problem may be avoided by implementing the following: setting the Active Time to include the period between the time of successful reception of RAR and the time of starting the Contention Resolution timer (for the case of contention-based preamble).

In other words, the situations for a contention-based preamble can be clarified as above. If UE has to wake up until the reception of C-RNTI regardless of other problems, the features described herein can be applied to situations for a dedicated preamble.

The maintenance of Uplink Time Alignment will be explained.

The UE may have a configurable Time Alignment Timer. The Time Alignment Timer is valid only in the cell for which it was configured and started.

If the Time Alignment Timer has been configured, the UE shall:
  when a Timing Advance MAC control element is received:
    apply the Timing Advance Command;
    start the Time Alignment Timer (if not running) or restart the Time Alignment Timer (if already running).
  when a Time Alignment Command is received in a Random Access Response message:
    if the Random Access Preamble and PRACH resource were explicitly signalled:
      apply the Time Alignment Command;
      start the Time Alignment Timer (if not running) or restart the Time Alignment Timer (if already running).
    else, if the Time Alignment Timer is not running or has expired:
      apply the Time Alignment Command;
      start the Time Alignment Timer;
      when the contention resolution is considered not successful, stop the Time Alignment Timer.
    else:
      ignore the received Time Alignment Command.
  when the Time Alignment Timer has expired or is not running:
    prior to any uplink transmission, use the Random Access procedure in order to obtain uplink Time Alignment.
  when the Time Alignment Timer expires:
    release all PUCCH resources;
    release any assigned SRS resources.

Discontinuous Reception (DRX) will be explained. The UE may be configured by the RRC with a DRX functionality that allows it to not continuously monitor the PDCCH. The DRX functionality consists of a Long DRX cycle, a DRX Inactivity Timer, a DRX Retransmission Timer, and optionally a Short DRX Cycle and a DRX Short Cycle Timer.

When a DRX cycle is configured, the Active Time includes the time:
  while the On-Duration Timer or the DRX Inactivity Timer or a DRX Retransmission Timer or the Contention Resolution Timer is running; or
  while a Scheduling Request is pending; or
  while an uplink grant for a retransmission can occur; or
  from the successful reception of a Random Access Response (RAR) to the starting of the Contention Resolution Timer.

Here, the Active Time can also be defined as:
  while a PDCCH indicating a new transmission addressed to the C-RNTI of the UE has not been received after successful reception of a Random Access Response, if the Random Access Preamble was explicitly signaled; or
  while the DL resuming timer is running. The DL resuming timer is started when successful RAR is received in case that the Random Access Preamble was explicitly signaled; (here, the DL resuming timer is stopped when the C-RNTI of the UE is received) (instead, it is also possible that the DL-resolution timer is started when a dedicated preamble is received over the PDCCH) or, from the successful reception of a Random Access Response (RAR) to the starting of the Contention Resolution Timer, if the Random Access Preamble was selected by the UE MAC.

When a DRX cycle is configured, the UE shall perform the following procedures for each sub-frame:
start the On Duration Timer when [(SFN*10)+sub-frame number] modulo (current DRX Cycle)=DRX Start Offset;
if a HARQ RTT Timer expires in this sub-frame and the data in the soft buffer of the corresponding HARQ process was not successfully decoded:
start the DRX Retransmission Timer for the corresponding HARQ process.
if a DRX Command MAC control element is received:
stop the On Duration Timer;
stop the DRX Inactivity Timer.
if the DRX Inactivity Timer expires or a DRX Command MAC control element is received in this sub-frame:
if the short DRX cycle is configured:
if the DRX Short Cycle Timer is not running, start the DRX Short Cycle Timer;
use the Short DRX Cycle.
else:
use the Long DRX cycle.
if the DRX Short Cycle Timer expires in this sub-frame:
use the long DRX cycle.
during the Active Time, for a PDCCH-sub-frame except if the sub-frame is required for uplink transmission for half-duplex FDD UE operation:
monitor the PDCCH;
if the PDCCH indicates a DL transmission:
start the HARQ RTT Timer for the corresponding HARQ process;
stop the DRX Retransmission Timer for the corresponding HARQ process.
if the PDCCH indicates a new transmission (DL or UL):
start or restart the DRX Inactivity Timer.
if a DL assignment has been configured for this sub-frame and no PDCCH indicating a DL transmission was successfully decoded:
start the HARQ RTT Timer for the corresponding HARQ process.
when not in active time, CQI and SRS shall not be reported.
Regardless of whether the UE is monitoring PDCCH or not the UE receives and transmits HARQ feedback when such is expected.

The inventive embodiments described herein can further be described as follows.

If no Random Access Response is received within the TTI window [RA_WINDOW_BEGIN-RA_WINDOW_END], or if all received Random Access Responses contain Random Access Preamble identifiers that do not match the transmitted Random Access Preamble, and the Random Access Response reception is considered not successful, the UE shall:
if the Random Access procedure was initiated by the MAC sub-layer itself; or if the Random Access procedure was initiated by a PDCCH order and the PREAMBLE_TRANSMISSION_COUNTER<PREAMBLE_TRANS_MAX: then increment PREAMBLE_TRANSMISSION_COUNTER by 1;
if PREAMBLE_TRANSMISSION_COUNTER=PREAMBLE_TRANS MAX+1: indicate (or report) a Random Access problem to upper layers.

if in this Random Access procedure:
the Random Access Preamble was selected by MAC; or
the Random Access Preamble and PRACH resource were explicitly signaled and will expire before the next available Random Access occasion:
based on the back-off parameter in the UE, compute and apply a back-off value indicating when a new Random Access transmission shall be attempted;
proceed to the selection of a Random Access Resource.
In other words, if the Contention Resolution is considered to be unsuccessful, the UE shall:
if the Random Access procedure was initiated by the MAC sub-layer itself; or
if the Random Access procedure was initiated by a PDCCH order and the PREAMBLE_TRANSMISSION_COUNTER<PREAMBLE_TRANS_MAX:
increment PREAMBLE_TRANSMISSION_COUNTER by 1;
if PREAMBLE_TRANSMISSION_COUNTER=PREAMBLE_TRANS_MAX+1:
indicate a Random Access problem to upper layers.
based on the back-off parameter in the UE, compute and apply a back-off value indicating when a new Random Access transmission shall be attempted;
proceed to the selection of a Random Access Resource.

The inventive concepts explained herein may also be described in the following manner.

In certain related art procedures, if a random access response (RAR: RACH MSG 2) is not received within a certain period of time during the RACH procedure, a different back-off time is applied for each mobile terminal and the RACH procedure is attempted again. If there is a failure of the RACH procedure, such is reported to the upper layer (RRC entity). However, this leads to undesirable delays due to the waiting period caused by the back-off time.

Thus, instead of waiting to report about any problems that occur in the RACH procedure, if a RACH procedure failure is detected, such failure is reported immediately to the upper layer (RRC entity), then the MAC entity (sub-layer) performs error correction and the RACH procedure is performed again, which results in less delays.

The features described herein can be summarized as follows.

A method of detecting a random access channel (RACH) failure, the method comprising: selecting and transmitting a random access channel (RACH) preamble; checking whether a random access response (RAR), which includes information about the transmitted RACH preamble, is received within a specified time; if the RAR is not received within the specified time or if the information about the transmitted RACH preamble included in the RAR does not match the transmitted RACH preamble, incrementing a preamble transmission counter by 1; comparing a value of the preamble transmission counter and a maximum value of the preamble transmission; indicating to an upper layer that the value of the preamble transmission counter is larger than the maximum value of the preamble transmission; and applying a back-off time to delay a subsequent RACH preamble transmission; or if the RAR is received within the specified time and if the information about the transmitted RACH preamble included in the RAR matches the transmitted RACH preamble, processing a received uplink grant value; if contention resolution is considered unsuccessful, incrementing a preamble transmission counter by 1; comparing a value of the preamble transmission counter and a maximum value of the preamble transmission; indicating to an upper layer that the value of the preamble transmission counter larger than the maximum value of the preamble transmission; and applying a back-off time to delay a subsequent RACH preamble transmission.

If the contention resolution is unsuccessful, applying a back-off time and selecting random access resources. The specified time is a transmission time interval (TTI) window. The comparing step comprises: comparing a value of the preamble transit counter that has been increased with a preamble transmit max value+1. Before transmitting the random access preamble, initializing one or more parameters related to random access is performed. The initialization step involves the initialization of the transmit counter.

A mobile terminal comprising: a transceiver configured to transmit a random access preamble; and a processor configured to control the transceiver and operate such that if a random access response is not received within a specified time or if information related to the random access preamble included in the random access response does not match with the transmitted random access preamble, incrementing a preamble transmit counter value; comparing a value of the preamble transmit counter with a preamble transmit maximum value; informing an upper layer that the preamble transmit counter value is greater than the preamble transmit maximum value; applying a back-off time to delay transmission of a subsequent random access preamble.

The processor operates such that if a random access response is received within a specified time and if information related to the random access preamble included in the random access response matches with the transmitted random access preamble, processing an uplink grant value included in the received random access response; incrementing the preamble transmit counter value by 1, if contention resolution with respect to the uplink grant value is unsuccessful; comparing a value of the preamble transmit counter with a preamble transmit maximum value; and informing the upper layer that the preamble transmit counter value is greater than the preamble transmit maximum value. The processor applies the back-off time if contention resolution is unsuccessful. The specified time is a transmission time interval (TTI) window.

A method of performing a random access channel (RACH) procedure between a mobile terminal and a network, the method comprising: detecting whether a random access response (RAR) is received from the network within a certain time period, the RAR including information about a random access channel (RACH) preamble transmitted to the network; and if the RAR is not received within the certain time period or if the information about the transmitted RACH preamble included in the RAR does not match the transmitted RACH preamble, performing a first procedure to detect failures in the RACH procedure; and if the RAR is received within the certain time period and if the information about the transmitted RACH preamble included in the RAR matches the transmitted RACH preamble, performing a second procedure to detect failures in the RACH procedure.

The first procedure comprises: incrementing a preamble transmission counter by 1; comparing a value of the preamble transmission counter and a maximum value of the preamble transmission; indicating to an upper layer that the value of the preamble transmission counter is larger than the maximum value of the preamble transmission; and applying a back-off time to delay a subsequent RACH preamble transmission.

The second procedure comprises: processing a received uplink grant value; and if contention resolution is considered unsuccessful, incrementing a preamble transmission counter by 1; comparing a value of the preamble transmission and a maximum value of the preamble transmission; indicating to an upper layer that the value of the preamble transmission counter larger than the maximum value of the preamble transmission; and applying a back-off time to delay a subsequent RACH preamble transmission. The certain time period is related to a transmission time interval (TTI).

The various features and concepts described herein may be implemented in software, hardware, or a combination thereof. For example, a computer program (that is executed in a computer, a terminal or a network device) for a method and system for detecting failures of random access procedures may comprise one or more program code sections for performing various tasks. Similarly, a software tool (that is executed in a computer, a terminal or a network device) for a method and system for detecting failures of random access procedures may comprise program code portions for performing various tasks.

The method and system for processing buffer status reports (BSRs) according to the present invention are compatible with various types of technologies and standards. Certain concepts described herein are related to various types of standards, such as GSM, WCDMA, 3GPP, LTE, IEEE, 4G and the like. However, it can be understood that the above exemplary standards are not intended to be limited, as other related standards and technologies would also be applicable to the various features and concepts described herein.

INDUSTRIAL APPLICABILITY

The features and concepts herein are applicable to and can be implemented in various types of user devices (e.g., mobile terminals, handsets, wireless communication devices, etc.) and/or network entities that can be configured to support detecting failures of random access procedures.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

What is claimed is:

1. A method of detecting a failure of a random access procedure, the method comprising:
    transmitting, by a user equipment (UE), a random access preamble;
    if a random access response (RAR) in response to the random access preamble is received within a random access response window and if the RAR includes information related to the random access preamble matching the transmitted random access preamble,
    transmitting uplink data to an eNodeB;
    monitoring a reception of a physical downlink control channel (PDCCH) to check whether contention resolution is successful until a timer for the contention resolution expires;
    if the contention resolution is not successful, incrementing, by the UE, a preamble transmission counter by 1;
    if a value of the preamble transmission counter is equal to a maximum value of the preamble transmission +1, indicating to an upper layer that there is a problem with the random access procedure; and
    applying, by the UE, a back-off time to delay a transmission of a subsequent random access preamble.

2. The method of claim 1, wherein the uplink data include a C-RNTI(common-Radio Network Temporary Identifier) MAC(medium access control) control element or a CCCH (common control channel) SDU(service data unit).

3. The method of claim 1, wherein the contention resolution is checked as successful if the PDCCH includes or indicates information related to the uplink data.

4. The method of claim 1, wherein the random access response window is a transmission time interval (TTI) window.

5. The method of claim 1, wherein, before transmitting the random access preamble, initializing one or more parameters related to random access.

6. The method of claim 5, wherein initializing involves the initialization of the preamble transmission counter.

7. A user equipment (UE) for detecting a failure of a random access procedure comprising:
- a transceiver configured to transmit a random access preamble; and
- a processor configured to control the transceiver and operate such that if a random access response (RAR) in response to the random access preamble is received within a random access response window and if the RAR includes information related to the random access preamble matching the transmitted random access preamble, transmitting uplink data to an eNodeB;
monitoring a reception of a physical downlink control channel (PDCCH) to check whether contention resolution is successful until a timer for the contention resolution expires;
if the contention resolution is not successful, incrementing a preamble transmission counter by 1;
if a value of the preamble transmission counter is equal to a maximum value of the preamble transmission +1, indicating to an upper layer that there is a problem with the random access procedure; and
applying a back-off time to delay a transmission of a subsequent random access preamble.

8. The UE of claim 7, wherein the uplink data include a C-RNTI(common-Radio Network Temporary Identifier) MAC(medium access control) control element or a CCCH (common control channel) SDU(service data unit).

9. The UE of claim 7, wherein the contention resolution is checked as successful if the PDCCH includes or indicates information related to the uplink data.

10. The UE of claim 7, wherein the random access response window is a transmission time interval (TTI) window.

11. The UE of claim 7, wherein, before transmitting the random access preamble, the processor is configured to initialize one or more parameters related to random access.

12. The UE of claim 11, wherein the parameters includes the preamble transmission counter.

* * * * *